US009692242B2

(12) United States Patent
Butzmann

(10) Patent No.: US 9,692,242 B2
(45) Date of Patent: Jun. 27, 2017

(54) BATTERY SYSTEM, METHOD FOR CHARGING BATTERY MODULES, AND METHOD FOR BALANCING BATTERY MODULES

(71) Applicants: Robert Bosch GmbH, Stuttgart (DE); Samsung SDI Co., Ltd., Yongin-si, Gyeonggi-do (KR)

(72) Inventor: Stefan Butzmann, Beilstein (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 680 days.

(21) Appl. No.: 13/855,787

(22) Filed: Apr. 3, 2013

(65) Prior Publication Data

US 2013/0257321 A1 Oct. 3, 2013

(30) Foreign Application Priority Data

Apr. 3, 2012 (DE) ........................ 10 2012 205 395

(51) Int. Cl.
*H02J 7/00* (2006.01)
*B60L 11/18* (2006.01)
*H01M 10/42* (2006.01)

(52) U.S. Cl.
CPC ......... *H02J 7/0068* (2013.01); *B60L 11/1805* (2013.01); *B60L 11/1812* (2013.01);
(Continued)

(58) Field of Classification Search
CPC .......... H02J 3/32; H02J 7/0014; H02J 7/0065; H02J 7/0068; B60L 11/1805; B60L 11/1809; B60L 11/1812; B60L 11/1851
(Continued)

(56) References Cited

U.S. PATENT DOCUMENTS 5,646,504 A   7/1997   Feldstein
5,659,237 A * 8/1997   Divan et al. .................. 320/119
(Continued)

FOREIGN PATENT DOCUMENTS

CN   201263095 Y   6/2009
CN   102035010 A   4/2011
(Continued)

*Primary Examiner* — Paul Dinh
(74) *Attorney, Agent, or Firm* — Maginot, Moore & Beck LLP

(57) ABSTRACT

A battery system has a battery with a plurality of battery modules which can be selectively activated or deactivated by means of actuation, wherein, in the activated state, the battery module voltage of a respective battery module contributes to an output voltage of the battery and, in the deactivated state, the battery module is uncoupled from the current path of the battery. The battery system comprises a circuit for charging the battery modules which has components which are arranged in accordance with a switching converter topology, which is integrated in the battery system in such a way that the battery modules can be charged independently of whether a respective battery module which is to be charged is in the activated or in the deactivated state. A method for charging battery modules, a method for balancing battery modules, and a motor vehicle include the battery system.

10 Claims, 3 Drawing Sheets

(52) U.S. Cl.
CPC ....... *B60L 11/1853* (2013.01); *B60L 11/1864* (2013.01); *B60L 11/1866* (2013.01); *H01M 10/4207* (2013.01); *H01M 2220/00* (2013.01); *Y02T 10/7005* (2013.01); *Y02T 10/7061* (2013.01); *Y02T 10/7072* (2013.01); *Y02T 90/127* (2013.01); *Y02T 90/14* (2013.01)

(58) Field of Classification Search
USPC .......................................... 320/119, 121, 140
See application file for complete search history.

(56) References Cited

U.S. PATENT DOCUMENTS

| | | | | |
|---|---|---|---|---|
| 5,847,942 | A | * | 12/1998 | Bazinet et al. ................. 363/25 |
| 6,100,652 | A | * | 8/2000 | Konopka ...................... 315/291 |
| 6,256,209 | B1 | * | 7/2001 | Gurwicz et al. ................ 363/17 |
| 7,529,110 | B1 | * | 5/2009 | Haines ............................ 363/65 |
| 2004/0095789 | A1 | * | 5/2004 | Li et al. ........................ 363/132 |
| 2005/0030772 | A1 | * | 2/2005 | Phadke ............................ 363/71 |
| 2005/0105311 | A1 | * | 5/2005 | Soldano .......................... 363/89 |
| 2010/0052559 | A1 | * | 3/2010 | Scollo et al. ................. 315/279 |
| 2010/0213897 | A1 | * | 8/2010 | Tse ................................ 320/116 |
| 2010/0231166 | A1 | * | 9/2010 | Lee et al. ...................... 320/118 |
| 2011/0309795 | A1 | * | 12/2011 | Firehammer et al. ........ 320/118 |
| 2012/0293129 | A1 | * | 11/2012 | Naghshtabrizi et al. ..... 320/118 |
| 2013/0076310 | A1 | * | 3/2013 | Garnier et al. ............... 320/118 |
| 2013/0234671 | A1 | * | 9/2013 | Choi ............................. 320/128 |

FOREIGN PATENT DOCUMENTS

| | | |
|---|---|---|
| DE | 10 2010 027 857 A1 | 10/2011 |
| DE | 10 2010 027 864 A1 | 12/2011 |
| WO | 2007/148745 A1 | 12/2007 |
| WO | 2012/038252 A1 | 3/2012 |

* cited by examiner

BATTERY SYSTEM, METHOD FOR CHARGING BATTERY MODULES, AND METHOD FOR BALANCING BATTERY MODULES

This application claims priority under 35 U.S.C. §119 to patent application no. DE 10 2012 205 395.6, filed on Apr. 3, 2012 in Germany, the disclosure of which is incorporated herein by reference in its entirety.

BACKGROUND

The present disclosure relates to a modular battery system. To be more precise, the disclosure relates to a battery system which has a battery with a plurality of battery modules which can be selectively activated or deactivated by means of actuation, wherein, in the activated state, the battery module voltage of a respective battery module contributes to an output voltage of the battery and, in the deactivated state, the battery module is uncoupled from the current path of the battery. The disclosure also relates to an associated method for charging battery modules and to a method for balancing battery modules. The disclosure also relates to a motor vehicle having the battery system disclosed herein.

It has become apparent that battery systems will be increasingly used both in stationary applications and in vehicles, such as hybrid and electric vehicles, in the future. In order to be able to meet the requirements for voltage and available power given for a respective application, a large number of battery cells are connected in series. Since the current which is provided by a battery of this kind has to flow through all battery cells and a battery cell can conduct only a limited current, battery cells are often additionally connected in parallel in order to increase the maximum current. It is often also advantageous to be able to set the battery voltage in a variable manner, for example in order to match the battery voltage to the operating situation of the motor.

Therefore, earlier patent applications by the applicant have presented battery systems which have one or more battery module lines, it being possible for the individual battery modules of the battery module lines to each be selectively connected and deactivated again in the battery module line. An example of a battery system having a battery module line of this kind is schematically illustrated in FIG. 1. According to FIG. 1, a battery system 100 has a plurality of battery modules 101 which are connected to one another in series and which form the battery module line. Each battery module 101 has one or more battery cells 102, only one of which is illustrated in the drawing for each battery module 101. Furthermore, FIG. 1 explicitly shows only two battery modules 101 but in many applications a battery module line comprises more than two battery modules 101, this being indicated in the drawing by dots. A battery module 101 can comprise any desired number of battery cells 102. According to one embodiment, each battery module 101 can have the same number of battery cells 102, but according to other embodiments one of the battery modules 101 can have a different number of battery cells 102 in comparison to the remainder of the battery modules 101. Each battery module 101 also has two switching elements 103, 104 in each case, wherein a respective battery module can be activated or deactivated depending on the switching position of the switching elements 103, 104. For example, in a switching position in which the switching element 103 of a battery module 101, which switching element is at the top in FIG. 1, is in the closed state, whereas the lower switching element 104 is in the open state, a respective battery module 101 is connected to the battery module line, with the result that the battery module voltage of the respective connected or activated battery module 101 contributes to a battery voltage which is available at the two terminals 105, 106. If, in contrast, the upper switching element 103 is open and the lower switching element 104 is closed according to another switching position, the respective battery module 101 is deactivated. To be more precise, a battery module 101 is uncoupled from the current path of the battery and electrically conductively bridged in the deactivated state, with the result that only the remaining, activated battery modules 101 contribute to the battery voltage and therefore can supply battery current and electrical energy.

One advantage of an arrangement according to FIG. 1 is that a variable, selectable battery voltage can be set in this way. For example, a sinusoidal profile of the battery voltage can be set at the terminals 105, 106 given sufficiently fine division of the battery module line into a plurality of battery modules 101 and given suitable actuation. If, furthermore, a plurality of battery module lines are used, these each being actuated to supply a sinusoidal output voltage, the method can be further correspondingly optimized. For example, three phase-offset sinusoidal voltages can be generated, with the result that a three-phase electric motor can be actuated without an interconnected inverter being required.

However, one disadvantage of a modular arrangement of this kind is that, in order to charge the battery cells 102, suitable confirmation typically also has to be provided by means of the switches 103, 104 which are provided for connecting and bridging purposes, with the result that each of the battery modules 101 is connected into the current path of the battery. To be more precise, in order to charge a battery module 101, for example, from an on-board vehicle electrical system, the respective battery module 101 has to be reconnected if it was previously in the deactivated state. Furthermore, charging of the battery modules 101 is generally possible only from the on-board vehicle electrical system. In FIG. 1, the battery current I is illustrated by the double-headed arrow, wherein the current I flows into the battery cells or is drawn from the battery cells depending on whether the battery is currently charged or discharged. In addition, for the purpose of charging the battery, the energy required for this purpose initially has to be transferred to the on-board vehicle electrical system in order to be able to then charge the cells by connecting the respective modules.

SUMMARY

According to the disclosure, a battery system is provided which has a battery with a plurality of battery modules which can be selectively activated or deactivated by means of actuation, wherein, in the activated state, the battery module voltage of a respective battery module contributes to an output voltage of the battery and, in the deactivated state, the battery module is uncoupled from the current path of the battery. The battery system also comprises a circuit for charging the battery modules which has components which are arranged in accordance with a switching converter topology, which is integrated in the battery sytem, in such a way that the battery modules can be charged independently of whether a respective battery module which is to be charged is in the activated or in the deactivated state.

A method for charging battery modules which can be selectively activated or deactivated by means of actuation is disclosed, wherein the method is characterized by the use of the circuit which is arranged in the battery system according to the disclosure for charging battery modules.

A method for balancing battery modules of a battery system, which battery modules can be selectively activated or deactivated by means of actuation, is provided according to yet another embodiment. According to the method, a circuit which has components which are arranged in accordance with a switching converter topology which is integrated in the battery system is used for balancing the battery modules according to the method.

Furthermore, a motor vehicle which has an electric motor and the battery system according to the disclosure is provided according to one embodiment, wherein the battery system according to the disclosure is arranged in a drive train of the electric motor.

One advantage of the battery system is that the battery modules or the battery cells of the battery modules can be charged in a particular way, wherein the battery system, in contrast to the prior art, manages without activation, that is to say connection, of individual battery modules. In particular, it is possible for the cell modules to be charged without energy having to be drawn from the on-board vehicle electrical system in the process.

This is achieved, in particular, in that additional means are provided in the battery system in order to charge the battery modules, as is described herein. To this end, components are provided in accordance with a switching converter topology which is integrated in the battery system in addition to the existing conventional current path of the battery modules which, to state it clearly, can be temporarily deflected by deactivation of the battery modules. According to the disclosure, the battery system is modified in such a way that it is designed, in particular, as a switching converter or has features or functions of a switching converter for the purpose of charging the battery modules.

According to the disclosure, energy can also be transferred from the on-board vehicle electrical system to the individual cell modules by means of the used switching converter topology, without relying on activation or connection of the individual battery modules, as a result of which a greater degree of flexibility is provided for battery systems of modular construction.

The battery system can advantageously be used particularly in battery systems of which the battery modules have two switching elements which are each arranged in such a way that a respective battery module is activated in a first switching position of the switching elements and the respective battery module is deactivated in a second switching position of the switching elements. However, the disclosure is not restricted to a battery module of this kind. Instead, according to other exemplary embodiments, the switching converter topology according to the disclosure is used in battery modules which can be activated or connected and deactivated again in another way.

According to a preferred embodiment, one or more of the battery modules in each case has a secondary-side circuit element of the switching converter topology, the output voltage of the said switching converter topology corresponding to the battery module voltage of a respective battery module. Therefore, for example in the case of a particularly preferred embodiment, the secondary-side circuit element can be constructed in such a way that it corresponds to a secondary-side circuit element of a conventional switching converter, wherein an output capacitor is replaced by one or more battery cells of the battery module.

The disclosure is not restricted to a particular design of switching converter. A flyback converter is preferably used. According to one embodiment, a switch for generating clocking of the switching converter or clocking of the switching converter topology is located on a primary side of the switching converter circuit.

In an advantageous embodiment, the switching converter topology is connected, by way of its primary side, to a terminal of the battery. This has the advantage that even cell modules which are actually switched off can be charged from the on-board vehicle electrical system and balancing between the cell modules, in particular during inactive phases (for example in the parked state), is possible. To this end, the battery modules, from which energy is intended to be drawn, are switched on.

Therefore, using the method according to the disclosure, energy can be drawn from activated battery modules and advantageously uniformly redistributed to all battery modules, including the deactivated battery modules, by clocking a switch.

According to a preferred embodiment, a switching converter is used which has a DC isolation means. The primary-side circuit element of the switching converter topology can advantageously be arranged such that it is DC-isolated from the battery modules. In particular, the DC isolation means makes it possible to ensure isolation between the charging electrical system, for example a 220 V domestic electrical system, and the vehicle electrical system.

In this case, the individual battery cell modules can be charged directly, that is to say without the use of the battery terminals or without drawing energy from activated battery modules which are already charged.

A power factor correction stage and a rectifier can typically be connected downstream of the switching converter on the primary side.

The battery cells according to the disclosure are preferably lithium-ion battery cells.

BRIEF DESCRIPTION OF THE DRAWINGS

Exemplary embodiments of the disclosure will be explained in greater detail with reference to the following description and the drawings, in which.

DETAILED DESCRIPTION

Figure 1:
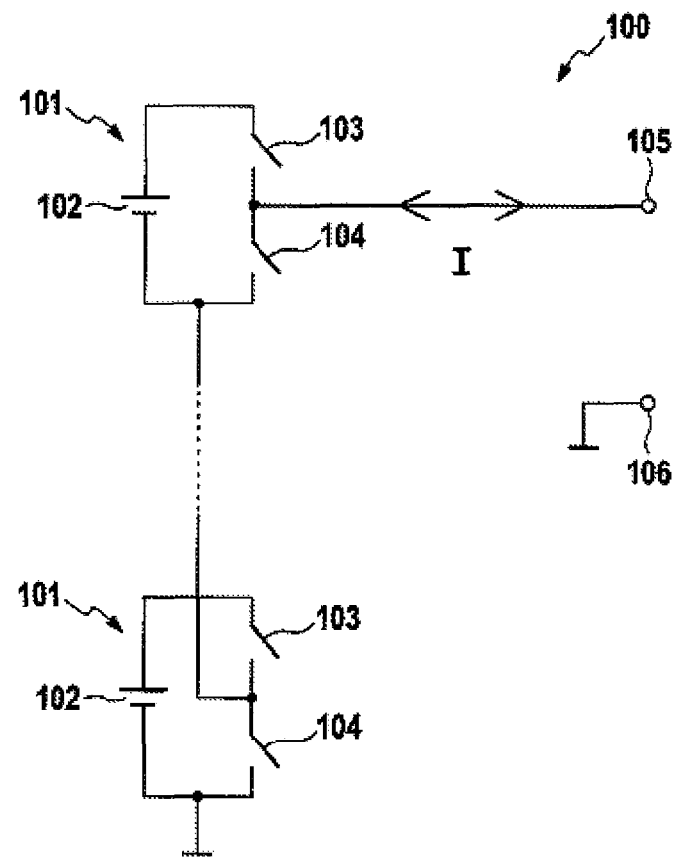
FIG. 1 shows a schematic illustration of a battery having a battery module line of modular construction according to the prior art.
Figure 2:
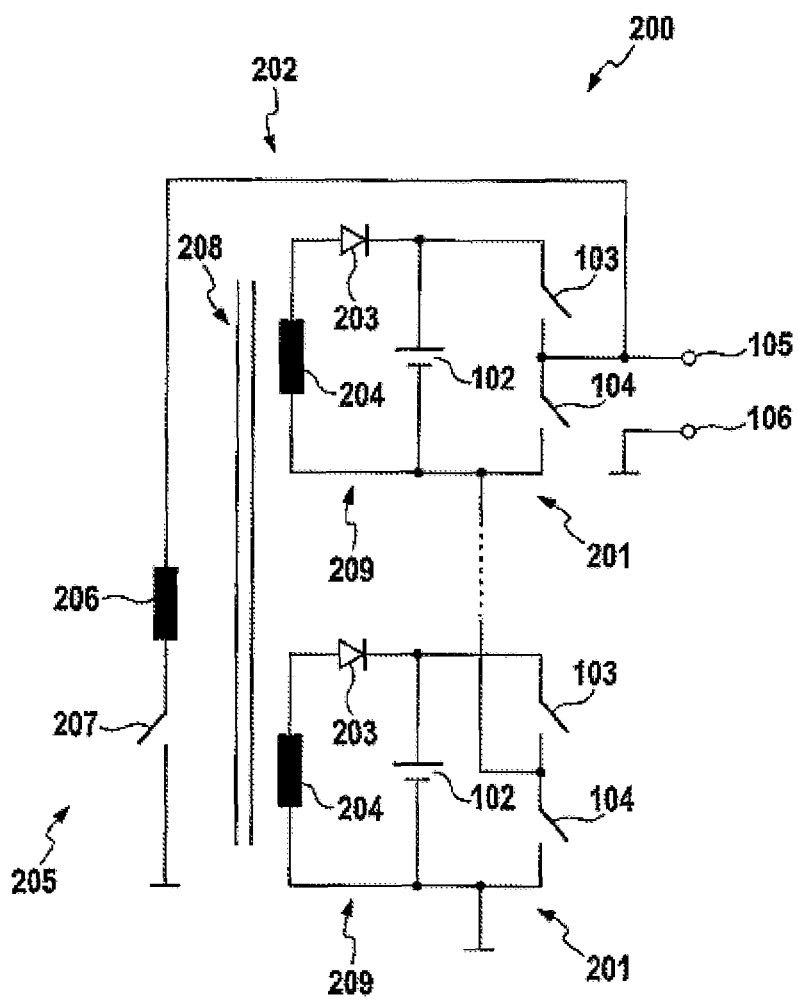
FIG. 2 shows a schematic basic illustration of a battery system having an integrated switching converter topology according to a first embodiment.

FIG. 2 shows a schematic basic illustration of a battery system 200 according to a first embodiment of the disclosure. In comparison to the battery system in FIG. 1, the circuit of each battery module 201 is supplemented with components which are arranged in accordance with a switching converter topology 202. To be more precise, a series circuit comprising a diode 203 and an inductance 204 are connected in parallel with each battery module 201. The parallel circuit according to the disclosure comprising the diode 203 and the secondary inductance 204 are components of a secondary-side circuit element 209 of the switching converter topology 202 which is integrated in the battery system 200, in order to allow for flexible charging of the battery modules 201 largely independently of the switching state of the battery modules 201. The switching converter, that is to say the switching converter topology 202, has a DC isolation means 208 which can be implemented, for example, by the air gap of a storage transformer or by a coil. The primary-side circuit element 205 of the switching converter topology 202 has a primary inductance 206 and is clocked by the switch 207 in order to transfer energy from the primary-side circuit element 205 to the secondary-side circuit elements 209 which are arranged in the battery modules 201. In this way, electrical energy can be drawn from the terminal 105 of the battery and can be uniformly transferred to the battery modules 201 across the DC isolation means 208. As an alternative to this, the energy for charging the battery modules 201 is drawn from the on-board vehicle electrical system, for example by the energy from the on-board vehicle electrical system being fed via the battery terminals 105, 106. This is the case particularly when the battery modules 201 are being charged and all battery modules 201 are deactivated at the same time. According to one variant of this embodiment, the switching converter topology 202 has exactly one primary circuit 205. According to other variants, the switching converter topology 202 is divided in another way, wherein the switching converter topology 202 has a plurality of primary circuits 205.

The arrangement according to the battery system 200 according to FIG. 2 allows, in particular, particularly flexible balancing of the battery modules 201.

Figure 3:
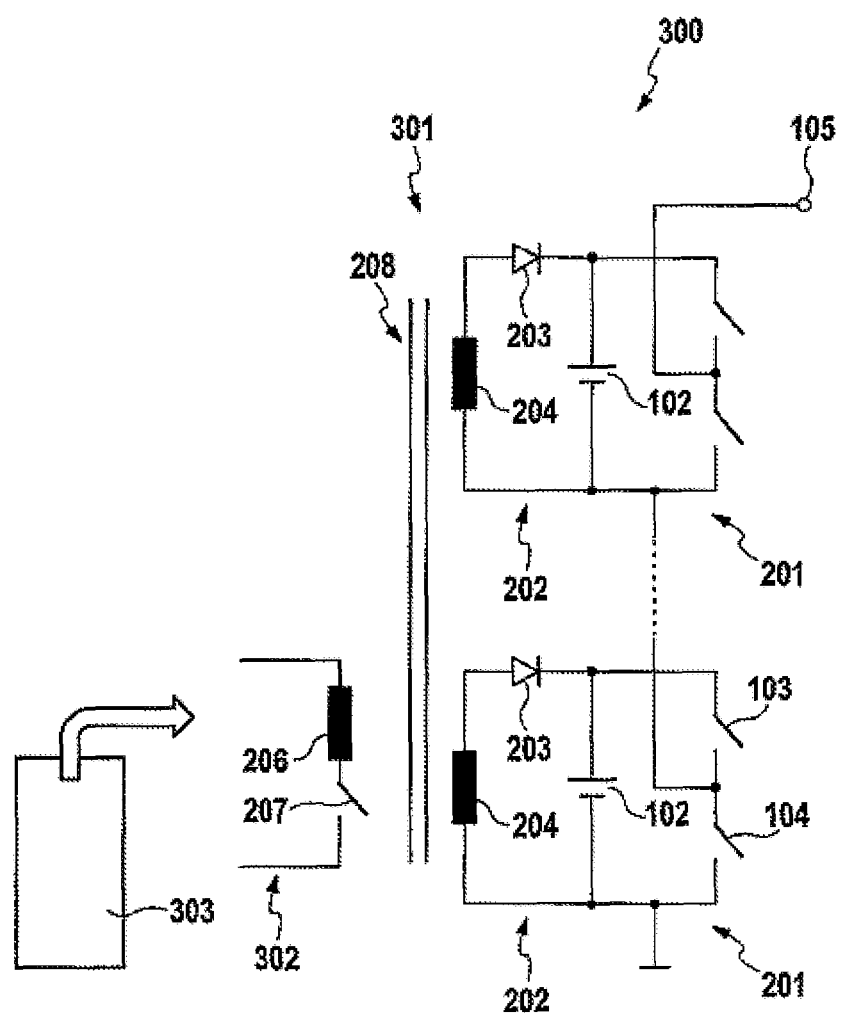
FIG. 3 shows a schematic basic illustration of a battery system having an integrated switching converter topology according to a second embodiment, wherein the battery modules can be directly charged.

FIG. 3 shows a schematic basic illustration of a battery system 300 according to a second embodiment of the disclosure. In contrast to the embodiment in FIG. 2, the battery modules 201 are charged directly, for example without the addition of the on-board vehicle electrical system, in the second embodiment of the disclosure. The embodiment according to FIG. 3 is particularly suitable for charging the battery modules 201, of example, by means of a 220 V domestic electrical system since the primary-side circuit element 302 of the switching converter topology 301 is arranged such that it is DC-isolated from the remainder of the circuit of the battery system 300 and from the battery modules 202 by means of the DC isolation means 208. Therefore, the energy from an external electrical system or the 220 V domestic electrical system can be fed directly to the primary-side circuit element 302. The input stage 303, which is connected upstream of the primary-side circuit element 302, typically has a power factor correction stage and a rectifier.

What is claimed is:

1. A battery system comprising:
a battery with a plurality of battery modules, which are configured such that each battery module of the plurality of battery modules is selectively activated or deactivated by an actuation device such that, in an activated state, a battery module voltage of a respective battery module of the plurality of battery modules contributes to an output voltage of the battery and, in a deactivated state, the respective battery module is uncoupled from a current path of the battery; and
a circuit configured to charge the battery modules, the circuit having components arranged in accordance with a switching converter topology, which is integrated in the battery system in such a way that the respective battery module is charged independently of whether the respective battery module, which is to be charged, is in the activated state or in the deactivated state.

2. The battery system according to claim 1, wherein each battery module of the plurality of battery modules includes two switching elements configured such that the respective battery module is activated in a first switching position of the switching elements and the respective battery module is deactivated in a second switching position of the switching elements.

3. The battery system according to claim 1, wherein one or more of the battery modules in each case has a secondary-side circuit element of the switching converter topology, the output voltage of the switching converter topology corresponding to the battery module voltage of the respective battery module.

4. The battery system according to claim 3, wherein the switching converter topology has a DC isolation mechanism.

5. The battery system according to claim 1, wherein a primary-side circuit element of the switching converter topology is configured such that the primary-side circuit element is DC-isolated from the plurality of battery modules.

6. The battery system according to claim 1, wherein the switching converter topology is connected, on a primary side, to a terminal of the battery.

7. The battery system according claim 1, further comprising: a power factor correction stage and a rectifier which are coupled, at an input end, to a primary side of the switching converter topology.

8. The battery system according to claim 1, wherein the switching converter topology includes a flyback converter.

9. The battery system of claim 1, wherein the battery system is arranged in a drive train of an electric motor of a motor vehicle.

10. A method for charging battery modules of a battery system, which includes a battery having a plurality of battery modules configured such that each battery module of the plurality of battery modules is selectively activated or deactivated by an actuation device such that, when activated, a battery module voltage of a respective battery module contributes to an output voltage of the battery and, when deactivated, the respective battery module is uncoupled from a current path of the battery, the method comprising:
using the actuation device to one of selectively activate and deactivate the respective battery module; and
charging the respective battery module using a circuit including components arranged in accordance with a switching converter topology, which is integrated in the battery system in such a way that the respective battery module is charged independently of whether the respective battery module, which is to be charged, is activated or deactivated.

* * * * *